(12) United States Patent
Salinas et al.

(10) Patent No.: US 6,667,879 B2
(45) Date of Patent: Dec. 23, 2003

(54) SYSTEM FOR LATCHING AND EJECTING A MODULAR COMPONENT FROM AN ELECTRONIC DEVICE

(75) Inventors: Everett R. Salinas, Pasadena, TX (US); George D. Megason, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/022,744

(22) Filed: Dec. 13, 2001

(65) Prior Publication Data

US 2002/0044419 A1 Apr. 18, 2002

(51) Int. Cl.[7] .................................................. G06F 1/16
(52) U.S. Cl. ...................... 361/685; 361/679; 361/683; 361/686
(58) Field of Search .......................... 361/679, 683–686

(56) References Cited

U.S. PATENT DOCUMENTS 5,319,519 A * 6/1994 Sheppard et al. ........... 361/685

FOREIGN PATENT DOCUMENTS

US          2003/0011978    *   1/2003   ................. 361/685

* cited by examiner

Primary Examiner—Darren Schuberg
Assistant Examiner—Yean Hsai Chang

(57) ABSTRACT

A latch and ejector system utilized in an electronic device. The latch and ejector system allows for the tool-less release and removal of various components, such as drives, from various electronic devices. The latch system secures the component within the electronic device during use but provides for the ready release and movement of the component to an ejected position. Once the component is at the ejected position, a user may readily remove the component.

20 Claims, 6 Drawing Sheets

SYSTEM FOR LATCHING AND EJECTING A MODULAR COMPONENT FROM AN ELECTRONIC DEVICE

FIELD OF THE INVENTION

The present invention relates generally to modular devices, such as drives, that are mounted in a variety of electronic devices, e.g. computers and servers. The invention is particularly related to a latch and ejector system for facilitating selective retention and ejection of the component from the chassis of the electronic device.

BACKGROUND OF THE INVENTION

A variety of electronic devices, such as computers and servers, comprise various components that may be replaced or interchanged with other components. For example, a computer or server typically has one or more drives. Such drives usually are mounted in a chassis via screws. To service, replace or switch drives, the computer is placed out of service while a technician removes screws and manually disconnects cables to exchange or service the drive, e.g. CD drive or floppy drive.

It would be advantageous to have a technique that facilitates the exchange of drives or a variety of other components used in electronic devices.

SUMMARY OF THE INVENTION

The present invention relates generally to a technique for tool-less exchange of components in an electronic device. An exemplary component is a drive that might be found in a computer or server. The technique utilizes a latch system that secures the component in a chassis. However, upon activation of the latch system, the component is both released and forced outwardly to an ejected position. When the component is moved to this ejected position, a user is readily able to grasp the component for servicing or for exchange with another component.

BRIEF DESCRIPTION OF THE DRAWINGS

The invention will hereafter be described with reference to the accompanying drawings, wherein like reference numerals denote like elements, and.

DETAILED DESCRIPTION OF EXEMPLARY EMBODIMENTS

Figure 1:
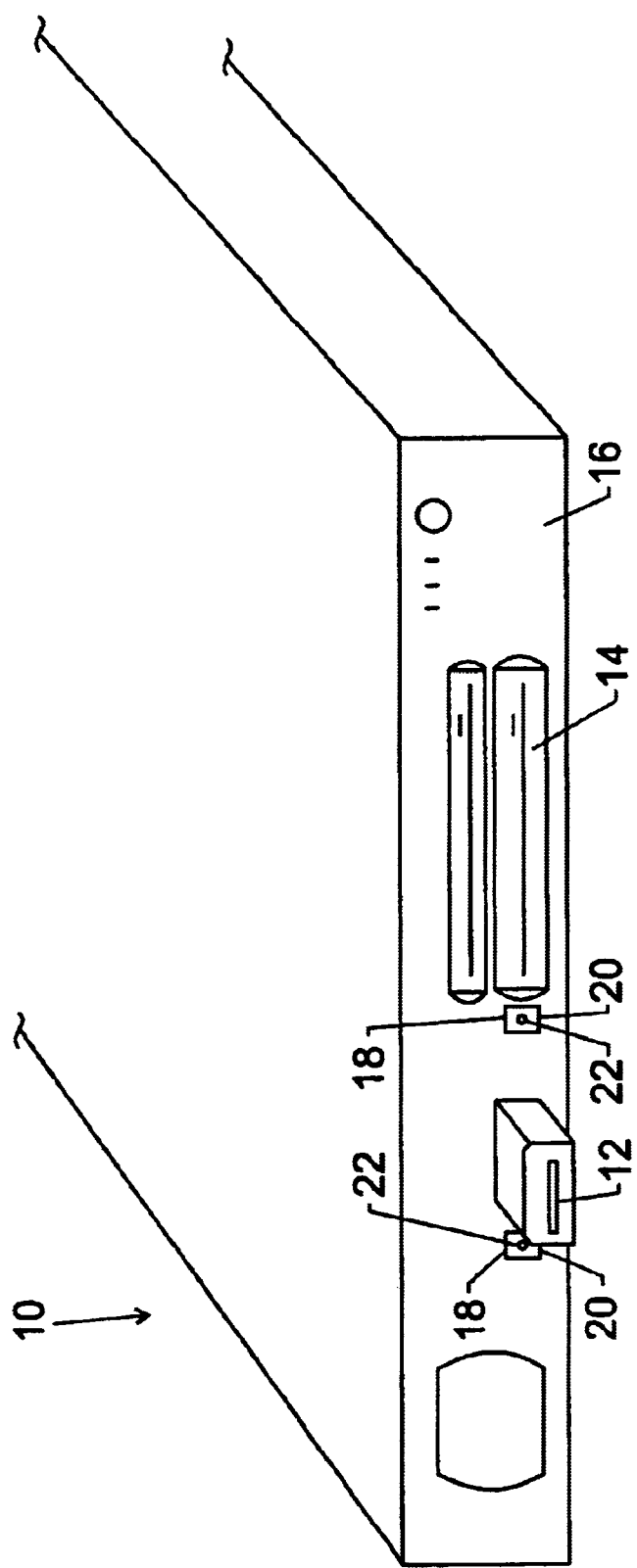
FIG. 1 is a perspective view an exemplary electronic device incorporating aspects of the present invention.

Referring generally to FIG. 1, an exemplary electronic device 10 is illustrated according to one embodiment of the present invention. Electronic device 10 may comprise, for example, a computer or a server having one or more removable components 12 and 14. A typical example of a removable component 12 or 14 is a drive, such as a CD drive, floppy drive, hard drive or DVD drive. The removable components or drives 12, 14 are accessible through a panel 16, such as a front panel of electronic device 10.

Device 10 also comprises at least one latch system 18 associated with at least one of the drives 12 or 14. In the embodiment illustrated, both drives 12 and 14 have a corresponding latch system 18. By actuating latch system 18, the corresponding drive or other removable component is released and moved to an ejected position. For example, in FIG. 1, drive 14 is illustrated in a latched or operating position, and drive 12 is illustrated in an ejected position that permits a user to easily grasp the drive and remove it from device 10. The latch system 18 is designed to electrically and mechanically disconnect the associated drive as it is forced outwardly to the ejected position. This facilitates easy exchange or servicing of a desired drive.

In the embodiment illustrated, the exemplary latch system 18 is actuated by pressing an actuator 19. One example of actuator 19 is a pair of push buttons 20 and 22. Push button 22 extends through the front of push button 20 such that a user initially presses push button 22 inwardly until contacting push button 20 which is then moved inwardly an additional distance. Depression of push button 22 mechanically releases the associated drive, and continued depression of push button 20 physically moves the drive to the ejected position.

Figure 2:
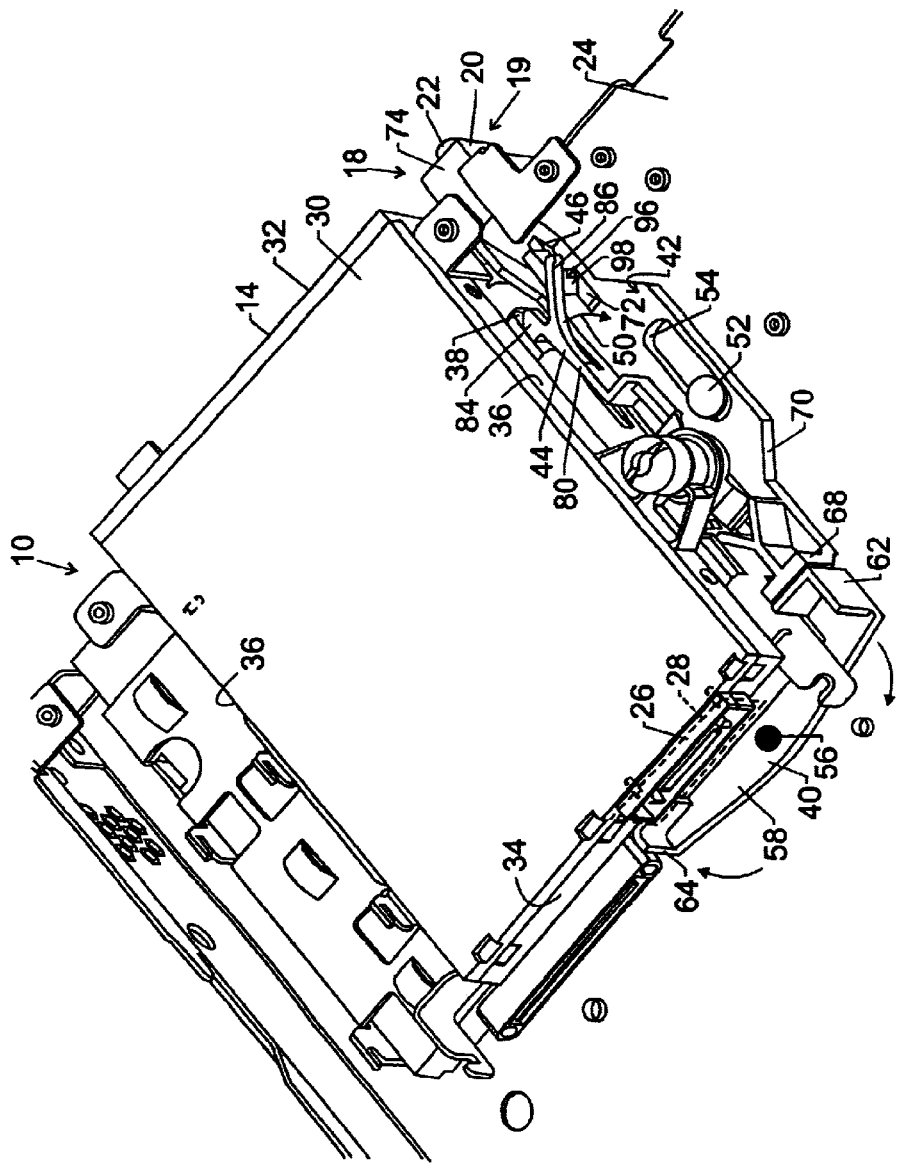
FIG. 2 is a perspective view of an exemplary drive and latch system mounted within a chassis.
Figure 3:
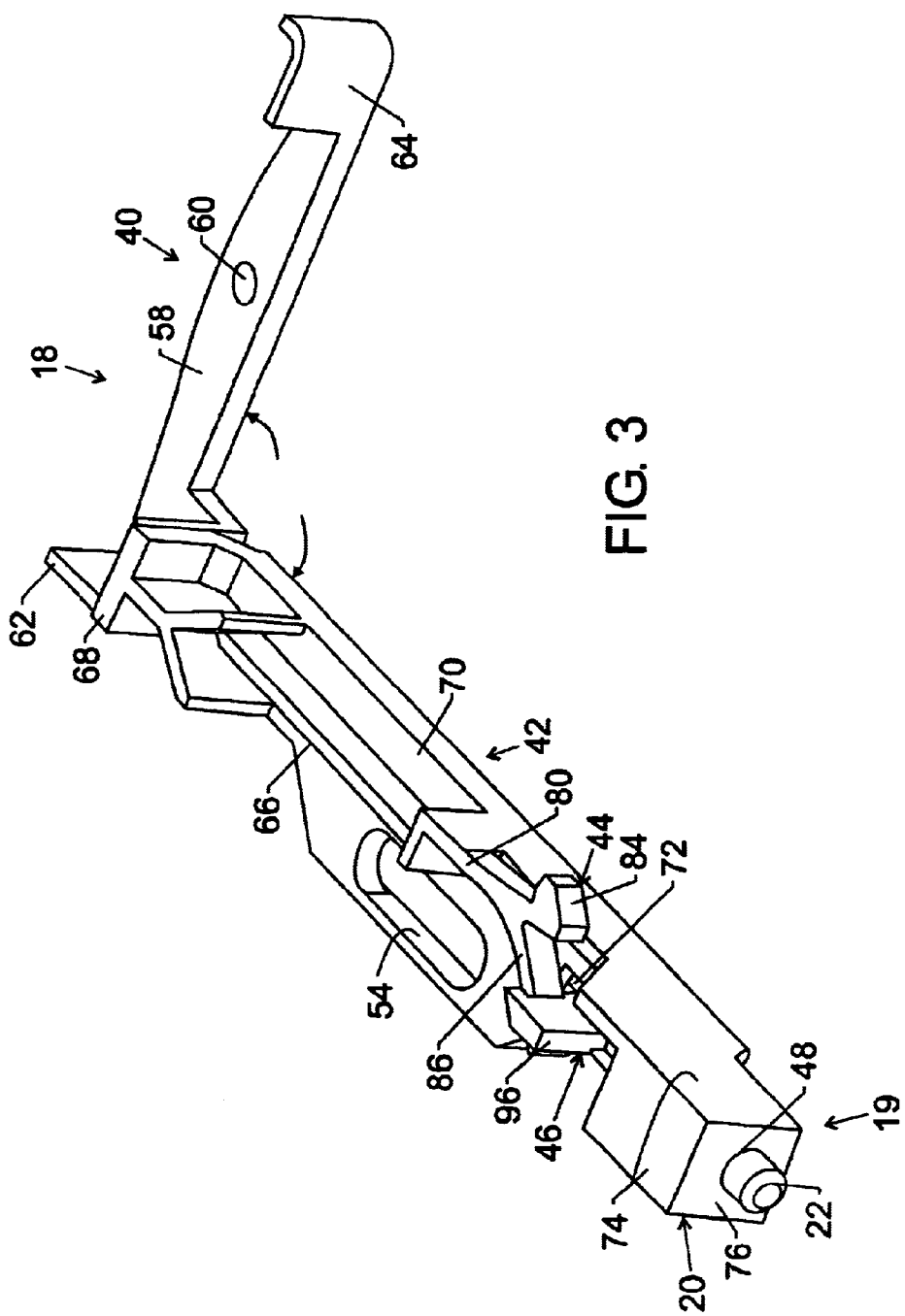
FIG. 3 is a perspective view of the exemplary latch system illustrated in FIG. 2.

Referring generally to FIGS. 2 and 3, one specific embodiment of latch system 18 is illustrated. As illustrated best in FIG. 2, latch system 18 is mounted to a chassis 24 of a desired electronic device, such as the computer or server discussed above. Mounted in chassis 24 is a movable component, e.g. movable component 14. In this particular embodiment, component 14 comprises a drive that is electrically coupled into electronic device 10 via a connector 26 that plugs into a corresponding connector 28 (shown in dashed lines) of device 10 when installed.

Movable component 14 comprises an outer housing 30 having a front 32, a back 34 and a pair of sides 36. Latch system 18 is positioned along one of the sides 36. This side 36 comprises a recessed or cutout portion 38 that interacts with latch system 18 to securely latch or hold component 14 when installed in electronic device 10.

Latch system 18 generally comprises a throw or lever 40, a base portion 42, a latch 44 and a release plunger 46 (see also FIG. 3). When component 14 is installed, latch 44 engages recessed portion 38 to securely hold the component within chassis 24. When latch system 18 is actuated, however, latch 44 is moved away from recessed portion 38 to release component 14. Subsequently, lever 40 is actuated against back 34 of component 14 to force the component outwardly to its ejected position. The lever acts against back 34 with sufficient force to disconnect connector 26 and to slide component 14 outwardly for servicing, replacement or exchange with another type of drive or other component.

It should be noted that a variety of levers, buttons, and other actuators can be used to release component 14 and to move the component to an ejected position. As illustrated, though, release plunger 46 comprises push button 22 that extends through an opening 48 formed through the front of push button 22. Push button 22 forms a part of base portion 42. To release and move component 14 to its ejected position, an individual presses push button 22 to move release plunger 46 against latch 44. This movement causes latch 44 to disengage from recessed portion 38, as indicated by arrow 50 of FIG. 1. As the user continues to depress push button 22, push button 20 is eventually engaged causing movement of base portion 42.

For example, base portion 42 may be slidably mounted to chassis 24 via one or more pins 52 extending from chassis 24 and engaged within a slot 54 formed in base portion 42. As base portion 42 is slid along pin 52, it acts against lever 40 and pivots lever 40 about a pivot 56. Pivot 56 may be formed by an appropriate boss or screw extending through lever 40 into engagement with chassis 24.

Lever 40 is positioned such that it is pivoted into back 34 of component 14 to force a disconnection of connector 26 and to move component 14 to its ejected position. Thus, a user is able to actuate latch system 18 with a single linear motion, e.g. by applying pressure with a thumb or forefinger, to both release and eject a given component.

Figure 4:
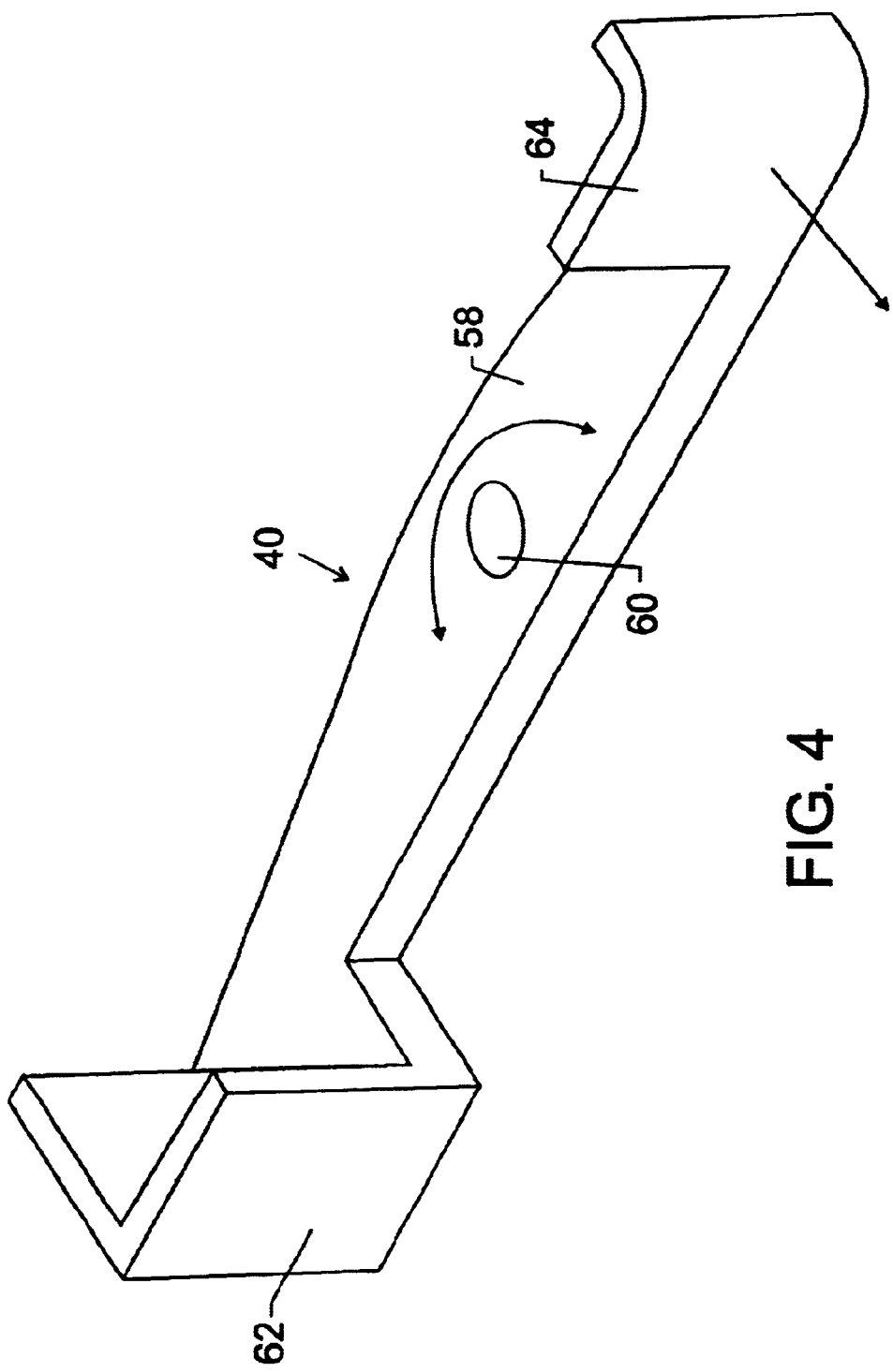
FIG. 4 is a perspective view of a lever portion of the system illustrated in FIG. 3.

As illustrated best in FIG. 4, an exemplary lever 40 comprises a pivot arm 58 having an opening 60 therethrough for receiving pivot 56. An abutment portion 62 is attached or formed at one end of pivot arm 58. Abutment portion 62 is designed to abuttingly engage base portion 42 when latch system 18 is actuated. At an end of pivot arm 58 generally opposite abutment portion 62, a press plate 64 is positioned to engage back 34 of component 14. Thus, as force is applied to abutment portion 62 by base portion 42, pivot arm 58 pivots about pivot 56 and drives press plate 64 against the back 34 of component 14. When sufficient force is applied, connector 26 is disconnected and component 14 is moved to its ejected position.

Figure 5:
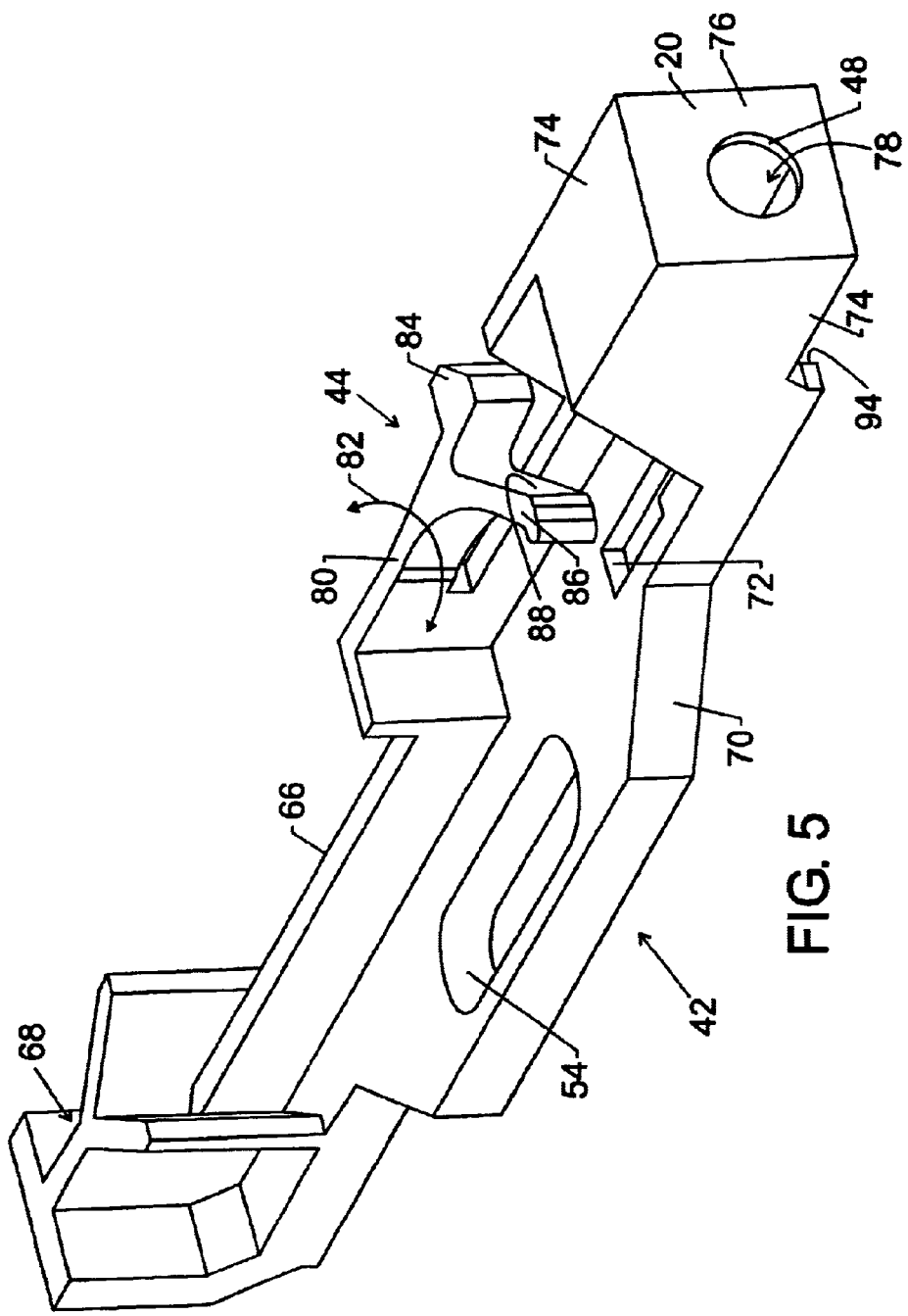
FIG. 5 is a perspective view of a latch and base portion of the system illustrated in FIG. 3.

Referring generally to FIG. 5, one exemplary embodiment of both base portion 42 and latch 44 is illustrated. Base portion 42 is designed generally as a plunger having a framework 66 extending between a press plate member 68 and push button 20. Framework 66 comprises a bottom plate 70 through which slot 54 is formed. Bottom plate 70 also comprises a slotted region 72 for slidably receiving release plunger 46.

Press plate member 68 is positioned to engage abutment portion 62 of lever 40 when push button 20 is pressed during actuation of latch system 18. Push button 20, on the other hand, is a generally hollow structure having a plurality of side walls 74 and a lead wall 76 through which opening 48 is formed. Push button 20 generally has a hollow interior 78 to receive release plunger 46.

Latch 44 is mounted to framework 66 by a spring member 80 to permit flexible motion of latch 44 as represented generally by arrow 82. Latch member 44 further comprises a catch 84 designed for insertion into recessed portion 38 of component 14. Spring member 80 biases catch 84 towards this engaged position. Thus, spring member 80 must be flexed against this bias to remove catch 84 when releasing and ejecting component 14.

To accomplish release of catch 84, latch 44 further comprises a spur 86 that extends across the sliding path of travel of release plunger 46. Spur 86 also is coupled to spring member 80 and disposed at an appropriate angle or arc such that movement of release plunger 46 against a slide surface 88 of spur 86 causes sufficient flex of spring member 80 to withdraw catch 84 from recessed portion 38. In the embodiment illustrated, spur 86 is positioned such that catch 84 is moved approximately twice the distance of the movement of release plunger 46 during release of component 14. However, the desired angle and/or arc of spur 86 and the resultant movement of catch 84 may vary from one application of latch system 18 to another.

Figure 6:
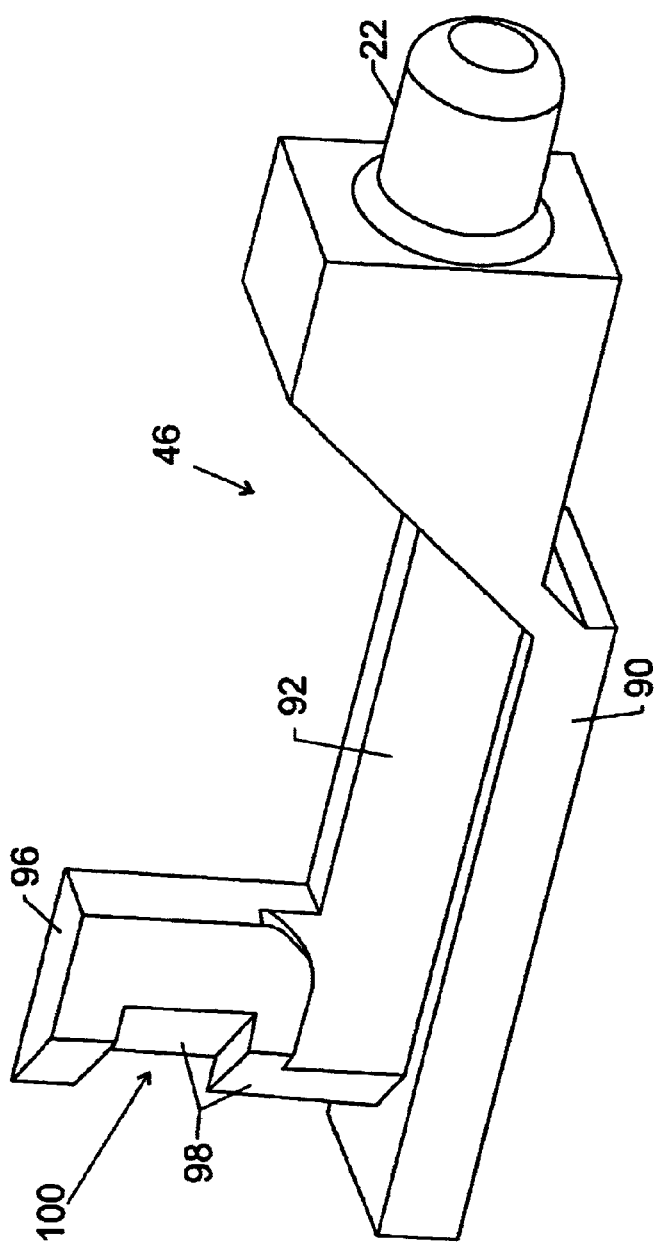
FIG. 6 is a perspective view of a plunger component utilized in the system illustrated in FIG. 3.

Referring generally to FIG. 6, one exemplary embodiment of release plunger 46 is illustrated. In this embodiment, push button 22 is mounted to a framework 90 that includes a slide member 92. Slide member 92 is sized and positioned to extend upwardly through slotted region 72 of base portion 42. Additionally, the width of framework 90 may be selected for sliding receipt in a lower groove 94 of base portion 42, as illustrated in FIG. 5.

An engagement plate 96 extends from slide member 92 such that the engagement plate also protrudes upwardly through slotted region 72 of base portion 42. Engagement plate 96 is positioned to engage slide surface 88 of spur 86 during actuation of latch 44 and release of catch 84. Engagement plate 96 may comprise an angled lead surface 98 angled to engage slide surface 88. Additionally, engagement plate 96 may include a notched region 100 sized to slidably receive spur 86 therein. Notched region 100 maintains spur 86 in a desired orientation during actuation.

The various components are combined to provide an easy, tool-less release and ejection of component 14. Actuation of both the release mechanism and the ejection mechanism only requires that a user provide a force and motion in one direction. However, it should be noted that other designs may deviate from this single motion depending on the particular design of electronic device 10 and tool-less latch system 18.

It will be understood that the foregoing description is of exemplary embodiments of this invention, and that the invention is not limited to the specific forms shown. For example, the latch system may be incorporated into a variety of electronic devices for the removal of different types of components; the latch system may be formed of various materials, including plastics and metals; and the size, shape, location and orientation of various features and components of the latch system may be changed for a given application. These and other modifications may be made in the design and arrangement of the elements without departing from the scope of the invention as expressed in the appended claims.

An electronic device, comprising:
    a chassis;
    a drive removably secured with respect to the chassis; and
    a latch system, the latch system comprising:
        an actuation member;
        a base portion slidably mounted to the chassis;
        a lever pivotably mounted relative to the chassis; and
        a latch configured to secure the drive relative to the chassis, the latch including a spur portion;
    wherein the actuation member is configured to slidingly engage the spur portion such that the latch is biased to a released position, and wherein the base portion is configured to pivot the lever against the drive such that the lever biases the drive to an ejected position.

What is claimed is:

1. An electronic device, comprising:
    a chassis;
    a drive removably secured with respect to the chassis; and
    a latch system, the latch system comprising:
        an actuation member;
        a base portion slidably mounted to the chassis;
        a lever pivotably mounted relative to the chassis; and
        a latch configured to secure the drive relative to the chassis, the latch including a spur portion;
    wherein the actuation member is configured to slidingly engage the spur portion such that the latch is biased to a released position, and wherein the base portion is configured to pivot the lever against the drive such that the lever biases the drive to an ejected position.

2. The electronic device as recited in claim 1, wherein the device comprises a recessed area to receive a catch portion of the latch.

3. The electronic device as recited in claim 1, wherein the spur portion comprises a slide surface against which the actuation member slides during actuation to release the latch.

4. The electronic device as recited in claim 3, wherein the latch comprises a spring member connected to the base portion.

5. The electronic device as recited in claim 1, wherein the actuation member comprises a button extending through an opening formed through the base portion.

6. The electronic device as recited in claim 1, wherein the latch comprises a stop surface configured to restrict continued movement of the actuation member with respect to the latch.

7. The electronic device as recited in claim 6, wherein the base portion is configured to bias the lever subsequent to engagement of the actuation member with the stop surface.

8. The electronic device as recited in claim 1, wherein the latch portion comprises a stop surface.

9. An electronic device, comprising:
   a chassis;
   a removable component; and
   a latching system to selectively hold and release the removable component from the chassis, the latching system comprising:
      a latch;
      a base portion slidably mounted with respect to the chassis, the base portion comprising a first release actuator;
      an actuation member having a second release actuator extending through the first release actuator; and
      a lever,
   wherein actuation of the first and second release actuators releases the latch and forces the lever to bias the removable component to an ejected position.

10. The device system as recited in claim 9, wherein the removable component comprises a drive.

11. The device system as recited in claim 10, wherein the removable component comprises a CD drive.

12. The device system as recited in claim 10, wherein the removable component comprises a hard drive.

13. The device system as recited in claim 10, wherein the removable component comprises a DVD drive.

14. The device system as recited in claim 10, wherein the removable component comprises a floppy drive.

15. The device system as recited in claim 10, wherein the chassis comprises a computer chassis.

16. The device system as recited in claim 9, wherein the first and second release buttons are configured to facilitate release of the removable component from the chassis via actuation of the button in a single motion.

17. A method of removing a modular component from an electronic device chassis, comprising:
   disengaging the modular component from a latch in response to an actuation member sliding against a spur portion surface of the latch; and
   moving the modular component to an ejected position in response to a base plunger causing a lever to pivot against a back side of the modular component.

18. The method as recited in claim 17, wherein disengaging comprises biasing the latch away from the modular component.

19. The method as recited in claim 17, further comprising, mechanically and electrically uncoupling data storage device from the electronic device chassis.

20. The method as recited in claim 17, further comprising engaging the actuation member with a stop surface of the spur portion of the latch.

* * * * *